Aug. 23, 1966 J. W. BRYAN 3,268,835
PUSH-PULL PLATE MODULATOR
Filed Dec. 23, 1964
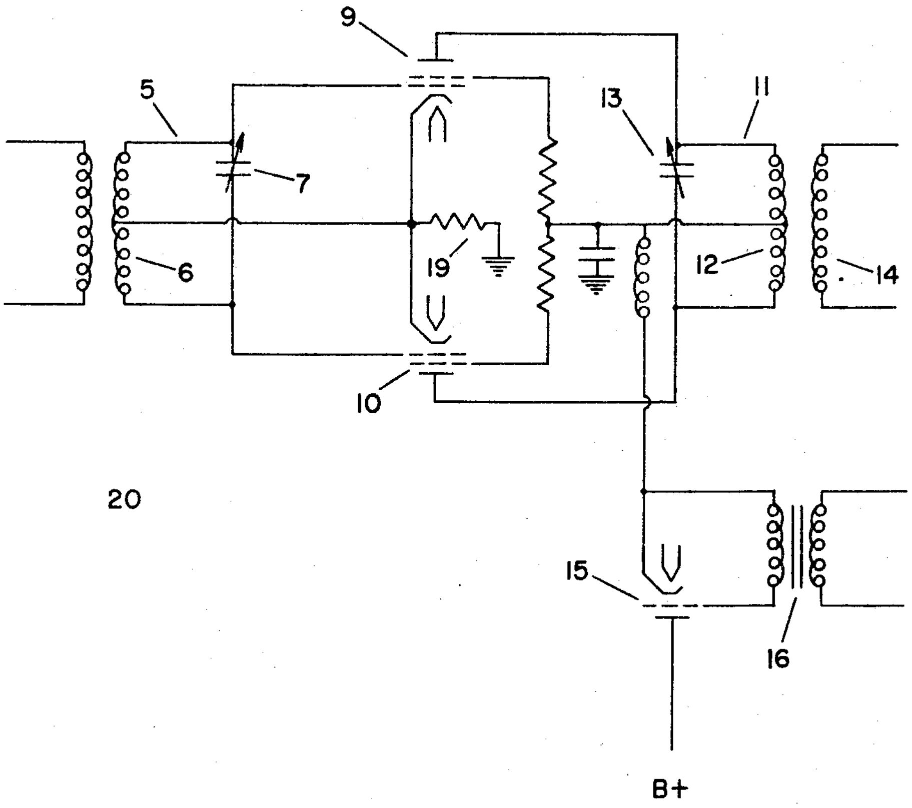
INVENTOR.
BY James W. Bryan United States Patent Office 3,268,835
Patented August 23, 1966

3,268,835
PUSH-PULL PLATE MODULATOR

James W. Bryan, 828 Marilyn Road, Fairdale, Ky.

Filed Dec. 23, 1964, Ser. No. 420,760
7 Claims. (Cl. 332—43)

This invention is to be utilized in a system as taught in applicant's earlier filed application for Carrier Current Modulation Systems, Serial No. 94,213, filed March 8, 1961, now abandoned, of which this application is a continuation-in-part.

This invention relates to communication systems of the wireless type and more particularly to systems employing a means for modulating radio frequency waves.

In conventional modulation systems, the carrier current remains constant and the modulation is contained in the frequencies making up the side bands.

The primary object of this invention resides in a modulation system wherein the carrier current is modulated in accordance with the modulating signal to produce a carrier current wherein the modulation is contained in the amplitude thereof.

A further object of the invention resides in the provision of a novel control tube which may be utilized to control the amplitude of a carrier by controlling the carrier current by an amount determined by the modulating frequencies utilized.

A still further object of the invention resides in the provision of a novel control tube which may be utilized to control the resonant frequency of a tuned resonant circuit by controlling the current supplied to said circuit which in turn may control the transmitting frequency of a transmitter.

The construction of this invention features the combined use of a carrier current transmitter and a control tube connected in such a manner that the transmitter supply current is controlled by the control tube.

A control tube so connected allows conduction of the transmitter supply current to rise to a maximum on positive half cycles of the modulating frequencies appearing on its grid and to a minimum on the negative half cycles.

The amplitude of the transmitter carrier current then will vary in the output by an amount determined by the modulating frequency utilized.

While the circuit illustrated in the drawing utilizes a push pull amplifier it is obvious that the modulating tube may be utilized in conjunction with a single ended amplifier and will prove far superior to conventional A.M. types of modulation in the effective power transmitted.

These together with the various ancillary objects and features of the invention, which will become apparent as the following descriptions proceeds, is attained by this system designed as a carrier current modulation system for use in radio circuits, particularly of the transmitting type, preferred embodiments of which have been illustrated in the accompanying drawing, by way of example, only wherein;

The drawing is a schematic wiring diagram of a carrier current amplifier incorporating the concepts of the present invention.

With continuing reference to the accompanying drawing, wherein there is shown a carrier current amplifier generally indicated by reference numeral 20, it will be noted that in lieu of a conventional modulating transformer there is provided a control tube 15, connected in a manner so as to control the supply current to the amplifier.

Since the supply current to the amplifier 20 is controlled by the control tube 15, the amplitude of the carrier current will vary with the modulating frequencies appearing on the control tube 15 grid.

The resonant circuits including condenser 7 and coil 6 of the tuned grid circuit 5, and condenser 13 and coil 12 of the tuned plate circuit 11 are tuned to the carrier frequency coupled to the tubes 9 and 10 from the previous stages. This conforms to the standard form of push pull operation.

However the amplifier tubes 9 and 10 having their plates connected to each end of the coil 12 of tuned circuit 11, will conduct in accordance with the modulating voltage appearing on the grid of the control tube 15, since the cathode of this tube is connected to the center-tap connection of coil 12.

With the control tube 15 connected in this manner the carrier current conducted through the tubes 9 and 10 will vary by an amount determined by the modulation coupled to the grid of the control tube 15 through the modulating transformer 16.

The modulated carrier current is then coupled to the remaining portions of the transmitter circuit through coil 14.

Assuming that the grid of the control tube 15 goes positive, conduction through the cathodes of tubes 9 and 10 causes them to become positive with respect to ground by an amount determined by the modulating frequency appearing on the grid of the control tube 15 since the center tap of the grid tank coil 6 is connected to the cathodes of tubes 9 and 10, the grids also assume the same potential as do the cathodes.

The control tube 15 connected in series with the supply current to the amplifier 20 is analogous to varying the voltage supplied to amplifier tubes 9 and 10.

Since the outputs of tubes 9 and 10 introduce the same signal it has the effect of causing the modulated signal to float above ground by an amount determined by the modulating frequences appearing on the control tube 15.

The modulating frequencies then allow conduction of the carrier current to occur at the modulating rate by controlling the supply current to the carrier amplifier. This rate obviously will vary with the modulating frequencies utilized, and it is to be recognized that the control tube 15 might well be connected in the cathode circuit of amplifier tubes 9 and 10 instead of the plate as is illustrated in the drawing.

The supply current conducted through the plate coil 12 of the tuned circuit 11 causes the effective reactance of the circuit to vary with modulation.

The transmitted signal may be received on either an A.M. or side-band type of receiver, one equally as well as the other. The system is limited in response only by the limitations of the modulating equipment utilized and provides a substantial increase in the effective power transmitted.

The system due to its narrow band width permits the modulating of the lower frequencies for television and the like, thereby providing long distance television transmission and reception.

The various component parts used in the construction of the modulator circuit are of standard values and it is to be recognized that the main concept of the invention lies in a modulation system where in the modulation is contained solely in the carrier current instead of the sum and difference side-band frequencies and of the use of a control tube as illustrated in the drawing for modulating the carrier, The foregoing is considered as illustrative only of the principles of the invention, further, since numerous modifications and changes will readily occur to those skilled in the art, it is not desired to limit the invention to the exact construction and operation shown and described and accordingly all suitable modifications and equivalents may be resorted to, falling withing the scope of the invention as claimed.

I claim:

1. A modulator comprising a first and second resonant circuit each including an inductor and capacitor, means for applying a carrier frequency source to said first resonant circuit, said resonant circuits being tuned to the carrier frequency, an amplifier means having a negativve return connected between said resonant circuits, a source of direct current voltage having a positive and a reference terminal; said reference terminal being connected to the negative return of said amplifier means and said first resonant circuit, a control means connected between said positive terminal and said second resonant circuit to vary the direct current voltage under control of a modulating signal whereby the amplitude of the carrier current in the amplifier means is determined by the modulating rate of the direct current voltage through said control means.

2. A combination in accordance with claim 1 in which said control means is connected between the reference terminal of said direct current voltage source and the negative return of said amplifier means and first resonant circuit whereby said carrier current is linearly modulated.

3. A combination in accordance with claim 1 in which said amplifier means includes a tube having at least a plate, a control grid, a cathode, and a screen grid, said reference terminal connected to said cathode and said first resonant circuit, said control means including a tube having a plate, grid, and cathode, said last named plate being connected to said positive terminal, a source of modulating signals coupled to the grid, said cathode of said control tube being coupled to the screen grid of said amplifier means and to said second resonant circuit.

4. A combination in accordance with claim 1 in which said amplifying means includes two tubes connected in push-pull between said resonant circuits, each having at least a plate, a control grid, a screen grid and a cathode, said reference terminal of said direct current voltage being connected to said cathodes and to an intermediate point of the inductor of said first resonant circuit, and said control means including a tube having a plate, grid and cathode, and said last named plate being connected to said positive terminal, a source of modulating signals coupled to the grid, said cathode of said control tube being coupled to both of the screen grids of said amplifier means and to an intermediate point of the second resonant circuit.

5. A combination in accordance with claim 1 in which said amplifier means includes a tube having at least a plate, a control grid, a screen grid and a cathode, said positive terminal connected to said screen grid and to said second resonant circuits, said control means including a tube having a plate, grid, and cathode, said last named cathode being connected to said reference terminal, a source of modulating signals coupled to the grid, said plate of said control tube being coupled to the cathode of said amplifier means and to said first resonant circuit.

6. A combination in accordance with claim 1 in which said amplifying means includes two tubes connected in push-pull between said resonant circuits, each having at least a plate, a control grid, a screen grid, and a cathode, said positive terminal of said direct current voltage being connected to said screen grids and to an intermediate point of the inductor of said second resonant circuit, said control means including a tube having a plate, grid and cathode, and said last named cathode being connected to said reference terminal, a source of modulating signals coupled to the grid, the plate of said control tube being coupled to both of the cathodes of said amplifying means and to an intermediate point of the first resonant circuit.

7. A combination in accordance with claim 1 in which a current is conducted through said second resonant circuit as a result of said modulating signal acting upon said source of direct current voltage to vary the reactance thereof.

References Cited by the Examiner

UNITED STATES PATENTS

| | | | |
|---|---|---|---|
| 1,802,767 | 4/1931 | Kummerer | 334—69 X |
| 2,013,807 | 9/1935 | Price | 332—61 |
| 2,074,440 | 3/1937 | Usselman | 332—43 |
| 2,877,420 | 3/1959 | Ehat | 332—56 X |
| 3,108,234 | 10/1963 | Burns | 332—59 |

OTHER REFERENCES

"Modulation Theory," 1953, Black, pub. Van Nostrand Co., page 130.

ROY LAKE, *Primary Examiner.*

NATHAN KAUFMAN, *Examiner.*

A. L. BRODY, *Assistant Examiner.*